(12) United States Patent
Bouchard et al.

(10) Patent No.: US 7,594,081 B2
(45) Date of Patent: Sep. 22, 2009

(54) DIRECT ACCESS TO LOW-LATENCY MEMORY

(75) Inventors: Gregg A. Bouchard, Round Rock, TX (US); David A. Carlson, Haslet, TX (US); Richard E. Kessler, Shrewsbury, MA (US); Muhammad R. Hussain, Pleasanton, CA (US)

(73) Assignee: Cavium Networks, Inc., Mountain View, CA (US)

( * ) Notice: Subject to any disclaimer, the term of this patent is extended or adjusted under 35 U.S.C. 154(b) by 220 days.

(21) Appl. No.: 11/024,002

(22) Filed: Dec. 28, 2004

(65) Prior Publication Data
US 2006/0059314 A1    Mar. 16, 2006

Related U.S. Application Data

(60) Provisional application No. 60/609,211, filed on Sep. 10, 2004.

(51) Int. Cl.
  G06F 12/00 (2006.01)
  G06F 13/00 (2006.01)
  G06F 13/28 (2006.01)
(52) U.S. Cl. ...................................................... 711/138
(58) Field of Classification Search .................. 711/138
  See application file for complete search history.

(56) References Cited

U.S. PATENT DOCUMENTS

| 4,415,970 | A | 11/1983 | Swenson et al. |
|---|---|---|---|
| 4,755,930 | A | 7/1988 | Wilson et al. |
| 4,780,815 | A | 10/1988 | Shiota |
| 5,091,846 | A | 2/1992 | Sachs et al. |
| 5,119,485 | A | 6/1992 | Ledbetter et al. |
| 5,155,831 | A | 10/1992 | Emma et al. |
| 5,276,852 | A | 1/1994 | Callander et al. |
| 5,404,483 | A | 4/1995 | Stamm et al. |
| 5,408,644 | A | 4/1995 | Schneider et al. |
| 5,590,368 | A | 12/1996 | Heeb et al. |
| 5,619,680 | A | 4/1997 | Berkovich et al. |

(Continued)

FOREIGN PATENT DOCUMENTS

GB    2378779 A    2/2003

OTHER PUBLICATIONS

"Double Data Rate SDRAMs operate at 400MHz", Oct. 14, 2003.*

(Continued)

*Primary Examiner*—Matt Kim
*Assistant Examiner*—Ralph A Verderamo, III
(74) *Attorney, Agent, or Firm*—Hamilton, Brook, Smith & Reynolds, P.C.

(57) ABSTRACT

A content aware application processing system is provided for allowing directed access to data stored in a non-cache memory thereby bypassing cache coherent memory. The processor includes a system interface to cache coherent memory and a low latency memory interface to a non-cache coherent memory. The system interface directs memory access for ordinary load/store instructions executed by the processor to the cache coherent memory. The low latency memory interface directs memory access for non-ordinary load/store instructions executed by the processor to the non-cache memory, thereby bypassing the cache coherent memory. The non-ordinary load/store instruction can be a coprocessor instruction. The memory can be a low-latency type memory. The processor can include a plurality of processor cores.

17 Claims, 6 Drawing Sheets

U.S. PATENT DOCUMENTS

| | | | |
|---|---|---|---|
| 5,623,627 | A | 4/1997 | Witt |
| 5,737,547 | A | 4/1998 | Zuravleff et al. |
| 5,737,750 | A | 4/1998 | Kumar et al. |
| 5,742,840 | A | 4/1998 | Hansen et al. |
| 5,754,819 | A | 5/1998 | Lynch et al. |
| 5,794,060 | A | 8/1998 | Hansen et al. |
| 5,794,061 | A | 8/1998 | Hansen et al. |
| 5,809,321 | A | 9/1998 | Hansen et al. |
| 5,822,603 | A | 10/1998 | Hansen et al. |
| 5,860,158 | A | 1/1999 | Pai et al. |
| 5,890,217 | A | 3/1999 | Kabemoto et al. |
| 5,893,141 | A | 4/1999 | Kulkarni |
| 5,897,656 | A | 4/1999 | Vogt et al. |
| 5,991,855 | A | 11/1999 | Jeddeloh et al. |
| 6,018,792 | A | 1/2000 | Jeddeloh et al. |
| 6,021,473 | A | 2/2000 | Davis et al. |
| 6,026,475 | A | 2/2000 | Woodman |
| 6,065,092 | A | 5/2000 | Roy |
| 6,070,227 | A | 5/2000 | Rokicki |
| 6,125,421 | A | 9/2000 | Roy |
| 6,134,634 | A | 10/2000 | Marshall et al. |
| 6,188,624 | B1 | 2/2001 | Zheng |
| 6,226,715 | B1 | 5/2001 | Van Der Wolf et al. |
| 6,279,080 | B1 | 8/2001 | DeRoo |
| 6,408,365 | B1 | 6/2002 | Hosomi |
| 6,438,658 | B1 | 8/2002 | Baliga et al. |
| 6,526,481 | B1 | 2/2003 | Shen et al. |
| 6,546,471 | B1 | 4/2003 | Tarui et al. |
| 6,560,680 | B2 | 5/2003 | Meyer |
| 6,563,818 | B1 | 5/2003 | Sang et al. |
| 6,571,320 | B1 | 5/2003 | Hachmann |
| 6,587,920 | B2 | 7/2003 | Mekhiel |
| 6,598,136 | B1 | 7/2003 | Norrod et al. |
| 6,622,214 | B1 | 9/2003 | Vogt et al. |
| 6,622,219 | B2 | 9/2003 | Tremblay et al. |
| 6,643,745 | B1 | 11/2003 | Palanca et al. |
| 6,647,456 | B1 | 11/2003 | Van Dyke et al. |
| 6,654,858 | B1 | 11/2003 | Asher et al. |
| 6,665,768 | B1 | 12/2003 | Redford |
| 6,718,457 | B2 | 4/2004 | Tremblay et al. |
| 6,725,336 | B2 | 4/2004 | Cherabuddi |
| 6,757,784 | B2 | 6/2004 | Lu et al. |
| 6,785,677 | B1 | 8/2004 | Fritchman |
| 6,924,810 | B1 | 8/2005 | Tishler |
| 7,055,003 | B2 | 5/2006 | Cargoni et al. |
| 7,093,153 | B1 | 8/2006 | Witek et al. |
| 7,209,996 | B2 | 4/2007 | Kohn et al. |
| 2001/0037406 | A1 | 11/2001 | Phibrick et al. |
| 2001/0054137 | A1 | 12/2001 | Eickemeyer et al. |
| 2002/0032827 | A1 | 3/2002 | Nguyen et al. |
| 2002/0099909 | A1* | 7/2002 | Meyer ........................ 711/117 |
| 2002/0112129 | A1 | 8/2002 | Arimilli et al. |
| 2003/0056061 | A1* | 3/2003 | Sherman ..................... 711/131 |
| 2003/0065884 | A1 | 4/2003 | Lu et al. |
| 2003/0067913 | A1 | 4/2003 | Georgiou et al. |
| 2003/0105793 | A1 | 6/2003 | Guttag et al. |
| 2003/0110208 | A1* | 6/2003 | Wyschogrod et al. ........ 709/202 |
| 2003/0115238 | A1 | 6/2003 | O'Connor et al. |
| 2003/0115403 | A1 | 6/2003 | Bouchard et al. |
| 2003/0172232 | A1 | 9/2003 | Naffziger |
| 2003/0212874 | A1 | 11/2003 | Alderson |
| 2004/0010782 | A1 | 1/2004 | Moritz |
| 2004/0059880 | A1 | 3/2004 | Bennett |
| 2004/0073778 | A1* | 4/2004 | Adiletta et al. .............. 712/220 |
| 2004/0250045 | A1 | 12/2004 | Dowling |
| 2005/0114606 | A1 | 5/2005 | Matick et al. |
| 2005/0138276 | A1 | 6/2005 | Navada et al. |
| 2005/0138297 | A1 | 6/2005 | Sodani et al. |
| 2005/0267996 | A1 | 12/2005 | O'Connor et al. |
| 2005/0273605 | A1 | 12/2005 | Saha et al. |
| 2006/0059310 | A1 | 3/2006 | Asher et al. |
| 2006/0059316 | A1 | 3/2006 | Asher et al. |
| 2006/0143396 | A1 | 6/2006 | Cabot |
| 2007/0038798 | A1 | 2/2007 | Bouchard et al. |

OTHER PUBLICATIONS

Jon Stokes, "A Look at Centrino's Core: The Pentium M" "Instuction decoding and micro-op fusion", http://arstechnica.com/articles/paedia/cpu/pentium-m.ars/4, Feb. 25, 2004, pp. 1-4.*

Handy, Jim. "The Cache memory Book." Academic Press, Inc. Second edition. pp. 85-86 (1998).

"Microsoft Computer Dictionary," 2002. Microsoft Press, Fifth Edition, p. 466.

Jouppi, Norman P., "Cache Write Policies and Performance," WRL Research Report 91/12 (1991).

Gharachorloo, Kourosh, et al., "Architecture and Design of AlphaServer GS320." Ninth International Conference on Architectural Support for Programming Languages and Operating Systems (ASPLOS-IX) (2000).

Rik van Riel, "Page replacement in Linux 2.4 memory management," Conectiva Inc., pp. 1-10 (Aug. 21, 2001); http://web.archive.org/web/20010821013232/http://surriel.com/lectures/linux24-vm.html.

"Double Date Rate SDRAMs operate at 4000MHz", Oct. 14, 2003.

* cited by examiner

LLM LOAD/STORE INSTRUCTION FORMAT

DIRECT ACCESS TO LOW-LATENCY MEMORY

RELATED APPLICATION

This application claims the benefit of U.S. Provisional Application No. 60/609,211, filed on Sep. 10, 2004. The entire teachings of the above application are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. For example, the Transmission Control Protocol (TCP)—an L4 network protocol requires several compute intensive tasks including computing a checksum over the entire payload in the packet, management of TCP segment buffers, and maintaining multiple timers at all times on a per connection basis. Although a general purpose processor can perform the compute intensive tasks, it does not provide sufficient performance to process the data so that it can be forwarded at wire-speed.

Furthermore, content aware applications that examine the content of packets require searching for expressions, which contain both fixed strings and character classes repeated a variable number of times, in a data stream. Several search algorithms are used to perform this task in software. One such algorithm is the Deterministic Finite Automata (DFA). There are limitations when using the DFA search algorithm, such as, exponential growth of graph size and false matches in a data stream with repeated patterns.

Due to these limitations, content processing applications require a significant amount of post processing of the results generated by pattern search. Post processing requires qualifying the matched pattern with other connection state information such as type of connection, and certain values in a protocol header included in the packet. It also requires certain other types of compute intensive qualifications, for example, a pattern match is valid only if it is within a certain position range within data stream, or if it is followed by another pattern and within certain range from the previous pattern or after/at a specific offset from the previous pattern. For example, regular expression matching combines different operators and single characters allowing complex expressions to be constructed.

SUMMARY OF THE INVENTION

The present invention is directed to increasing the speed at which a processor can perform content processing applications. The processor includes a system interface to cache coherent memory and a low latency memory interface to a non-cache coherent memory. The system interface directs memory access for ordinary load/store instructions executed by the processor to the cache coherent memory. The low latency memory interface directs memory access for non-ordinary load/store instructions executed by the processor to the non-cache memory, thereby bypassing the cache coherent memory. The non-ordinary load/store instruction can be a coprocessor instruction. The memory can be a low-latency type memory. The processor can include a plurality of processor cores.

In one embodiment, the low latency interface can be a bus coupling the processor to the non-cached memory, the coupling allowing direct access between the processor and the non-cached memory. In another embodiment, data can be stored in a deterministic finite automata (DFA) graph in the memory for performing the content aware application processing.

In another embodiment, the processor can include a plurality of registers for moving the data between the processor core and the memory. The plurality of registers can be located within the processor. The plurality of registers located within the processor can be separate from a main register file located within the processor.

In another embodiment, the low-latency memory can be selected from a group consisting of dynamic random access memory (DRAM), reduced latency dynamic random access memory (RLDRAM), static random access memory (SRAM), and fast cycle random access memory (FCRAM), wherein the processor accesses the RLDRAM with less than or equal to 30 nanosecond latency.

A network services processor integrates network, security and content processing according to the principles of the present invention. The network services processor includes built-in hardware acceleration for content and security processing, along with on-chip co-processor modules for Internet Services acceleration.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
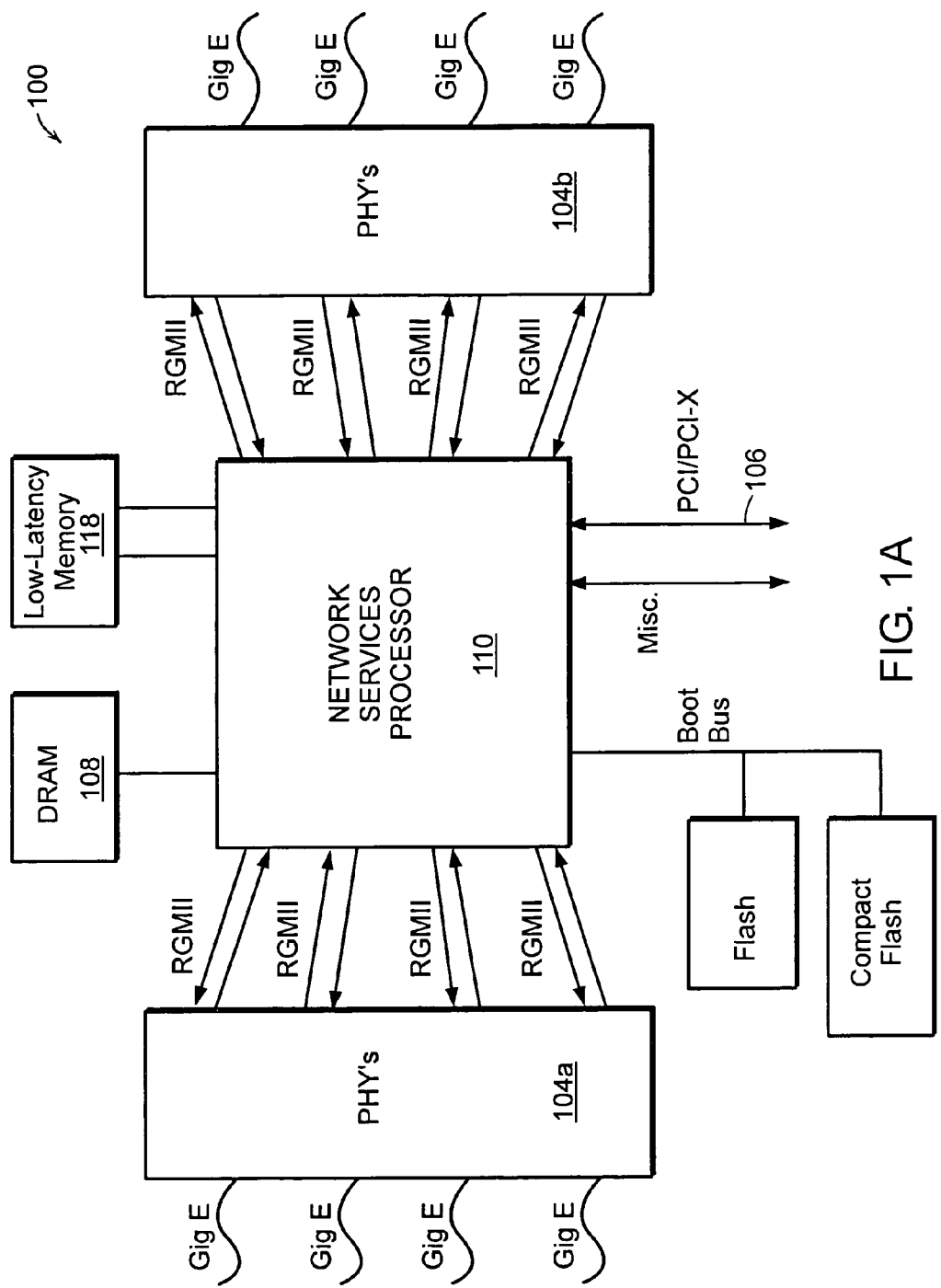
FIG. 1A is a block diagram of a network service processing system including a network services processor according to the principles of the present invention.

FIG. 1A is a block diagram of a security appliance 100 including a network services processor 110 according to the principals of the present invention. The security appliance 100 is a standalone system that can switch packets received at one Ethernet port (Gig E) to another Ethernet port (Gig E) and perform a plurality of security functions on received packets prior to forwarding the packets. For example, the security appliance 100 can be used to perform security processing on packets received on a Wide Area Network prior to forwarding the processed packets to a Local Area Network.

The network services processor 110 includes hardware packet processing, buffering, work scheduling, ordering, synchronization, and cache coherence support to accelerate all packet processing tasks. The network services processor 110 processes Open System Interconnection network L2-L7 layer protocols encapsulated in received packets.

The network services processor 110 receives packets from the Ethernet ports (Gig E) through physical interfaces PHY 104a, 104b, performs L7-L2 network protocol processing on the received packets and forwards processed packets through the physical interfaces 104a, 104b or through a PCI bus 106. The network protocol processing can include processing of network security protocols such as Firewall, Application Firewall, Virtual Private Network (VPN) including IP Security (IPSEC) and/or Secure Sockets Layer (SSL), Intrusion detection System (IDS) and Anti-virus (AV).

A Dynamic Random Access Memory (DRAM) controller in the network services processor 110 controls access to an external DRAM 108 that is coupled to the network services processor 110. The DRAM 108 is external to the network services processor 110. The DRAM 108 stores data packets received from the PHYs interfaces 104a, 104b or the Peripheral Component Interconnect Extended (PCI-X) interface 106 for processing by the network services processor 110.

A low-latency memory controller in the network services processor 110 controls low-latency memory (LLM) 118. The LLM 118 can be used for Internet Services and Security applications allowing fast lookups, including regular expression matching that may be required for Intrusion Detection System (IDS) or Anti Virus (AV) applications.

Regular expressions are a common way to express string matching patterns. The atomic elements of a regular expression are the single characters to be matched. These are combined with meta-character operators that allow a user to express concatenation, alternation, Kleene-star, etc. Concatenation is used to create multiple character matching patterns from a single charters (or sub-strings) while alternation (|) is used to create patterns that can match any of two or more sub-strings. Kleene-star (*) allows a pattern to match zero (0) or more occurrences of the pattern in a string. Combining different operators and single characters allows complex expressions to be constructed. For example, the expression (th(is|at)*) will match th, this, that, thisis, thisat, thatis, thatat, etc.

Figure 1B:
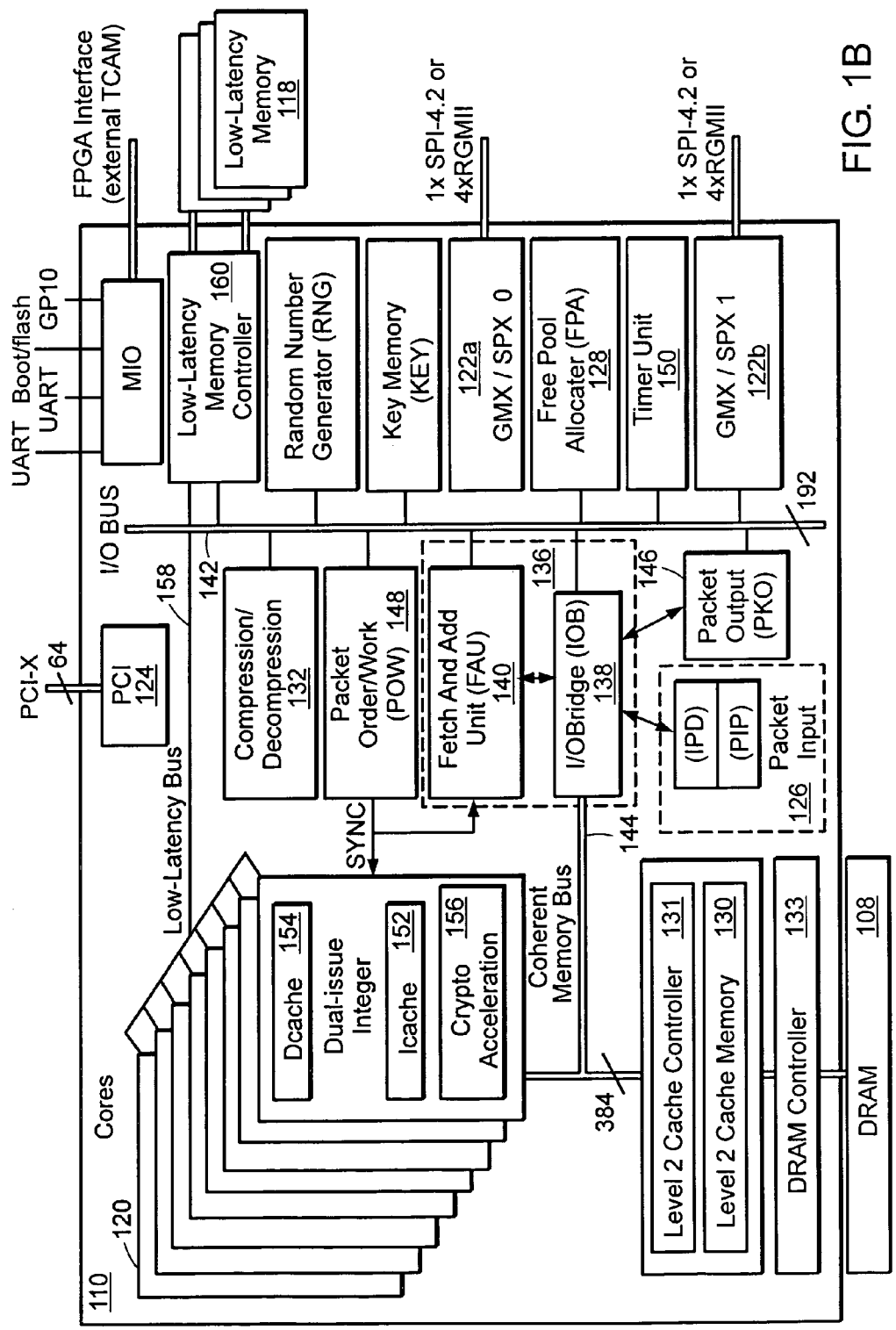
FIG. 1B is a block diagram of the network services processor shown in FIG. 1A.

FIG. 1B is a block diagram of the network services processor 110 shown in FIG. 1A. The network services processor 110 delivers high application performance using at least one processor core 120 as described in conjunction with FIG. 1A.

A packet is received for processing by any one of the GMX/SPX units 122a, 122b through an SPI-4.2 or RGM II interface. A packet can also be received by a PCI interface 124. The GMX/SPX unit (122a, 122b) performs pre-processing of the received packet by checking various fields in the L2 network protocol header included in the received packet and then forwards the packet to a packet input unit 126.

The packet input unit 126 performs further pre-processing of network protocol headers (L3 and L4) included in the received packet. The pre-processing includes checksum checks for Transmission Control Protocol (TCP)/User Datagram Protocol (UDP) (L3 network protocols).

A Free Pool Allocator (FPA) 128 maintains pools of pointers to free memory in level 2 cache memory 130 and DRAM 108. The input packet processing unit 126 uses one of the pools of pointers to store received packet data in level 2 cache memory 130 or DRAM 108 and another pool of pointers to allocate work queue entries for the processor cores 120.

The packet input unit 126 then writes packet data into buffers in Level 2 cache 130 or DRAM 108 in a format that is convenient to higher-layer software executed in at least one processor core 120 for further processing of higher level network protocols.

The network services processor 110 also includes application specific co-processors that offload the processor cores 120 so that the network services processor achieves high-throughput. The compression/decompression co-processor 132 is dedicated to performing compression and decompression of received packets. In one embodiment, a deterministic finite automata (DFA) module (not shown) may include dedicated DFA engines to accelerate pattern and signature match necessary for anti-virus (AV), Intrusion Detection Systems (IDS) and other content processing applications at up to 4 Gbps.

An I/O Interface (IOI) 136 manages the overall protocol and arbitration and provides coherent I/O partitioning. The IOI 136 includes an I/O Bridge (IOB) 138 and a Fetch and Add Unit (FAU) 140. Registers in the FAU 140 are used to maintain lengths of the output queues that are used for forwarding processed packets through the packet output unit 126. The IOB 138 includes buffer queues for storing information to be transferred between an I/O Bus 142, a coherent memory bus 144, the packet input unit 126 and the packet output unit 146.

A Packet order/work (POW) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores.

Processor cores 120 request work from the POW module 148. The POW module 148 selects (i.e. schedules) work for a processor core 120 and returns a pointer to the work queue entry that describes the work to the processor core 120.

The processor core 120 includes instruction cache 152, level 1 (L1) data cache 154 and crypto acceleration 156. In one embodiment, the network services processor 100 (FIG. 1A) includes sixteen superscalar RISC (Reduced Instruction Set Computer)-type processor cores 120. In one embodiment, each superscalar RISC-type processor core 120 is an extension of the MIPS64 version 2 processor core.

Level 2 (L2) cache memory 130 and DRAM 108 is shared by all of the processor cores 120 and I/O co-processor devices. Each processor core 120 is coupled to the Level 2 cache memory 130 by the coherent memory bus 144. The coherent memory bus 144 is a communication channel for all memory and I/O transactions between the processor cores 100, the IOI 136 and the L2 cache memory 130 and a L2 cache memory controller 131. In one embodiment, the coherent memory bus 144 is scalable to 16 processor cores 120, supports fully coherent L1 data caches 154 with write through, is highly buffered and can prioritize I/O.

The L2 cache memory controller 131 maintains memory reference coherence. It returns the latest copy of a block for every fill request, whether the block is stored in L2 cache memory 130, in DRAM 108 or is in-flight. It also stores a duplicate copy of the tags for the data cache 154 in each processor core 120. It compares the addresses of cache block store requests against the data cache tags, and invalidates (both copies) a data cache tag for a processor core 120 whenever a store instruction is from another processor core or from an I/O component via the IOI 136.

A DRAM controller 133 supports up to 16 Mbytes of DRAM. The DRAM controller 133 supports a 64-bit or 128-bit interface to DRAM 108. The DRAM controller 133 supports DDR-I (Double Data Rate) and DDR-II protocols.

After the packet has been processed by the processor cores 120, the packet output unit (PKO) 146 reads the packet data from memory, performs L4 network protocol post-processing (e.g., generates a TCP/UDP checksum), forwards the packet through the GMX/SPC unit 122a, 122b and frees the L2 cache 130/DRAM 108 used by the packet.

A low-latency memory controller 160 manages in-flight transactions (loads/stores) to/from the LLM 118. The low-latency memory (LLM) 118 is shared by all of the processor cores 120. The LLM 118 can be dynamic random access memory-(DRAM), reduced latency dynamic random access memory (RLDRAM), synchronous random access memory (SRAM), fast cycle random access memory (FCRAM) or any other type of low-latency memory known in the art. The RLDRAM provides 30 nanosecond memory latency or better; that is, the time taken to satisfy a memory request initiated by the processor 120. Each processor core 120 is directly coupled to the LLM controller 160 by a low-latency memory bus 158. The low-latency memory bus 158 is a communication channel for content aware application processing between the processor cores 120 and the LLM controller 160. The LLM controller 160 is coupled between the processor cores 120 and the LLM 118 for controlling access to the LLM 118.

Figure 2:
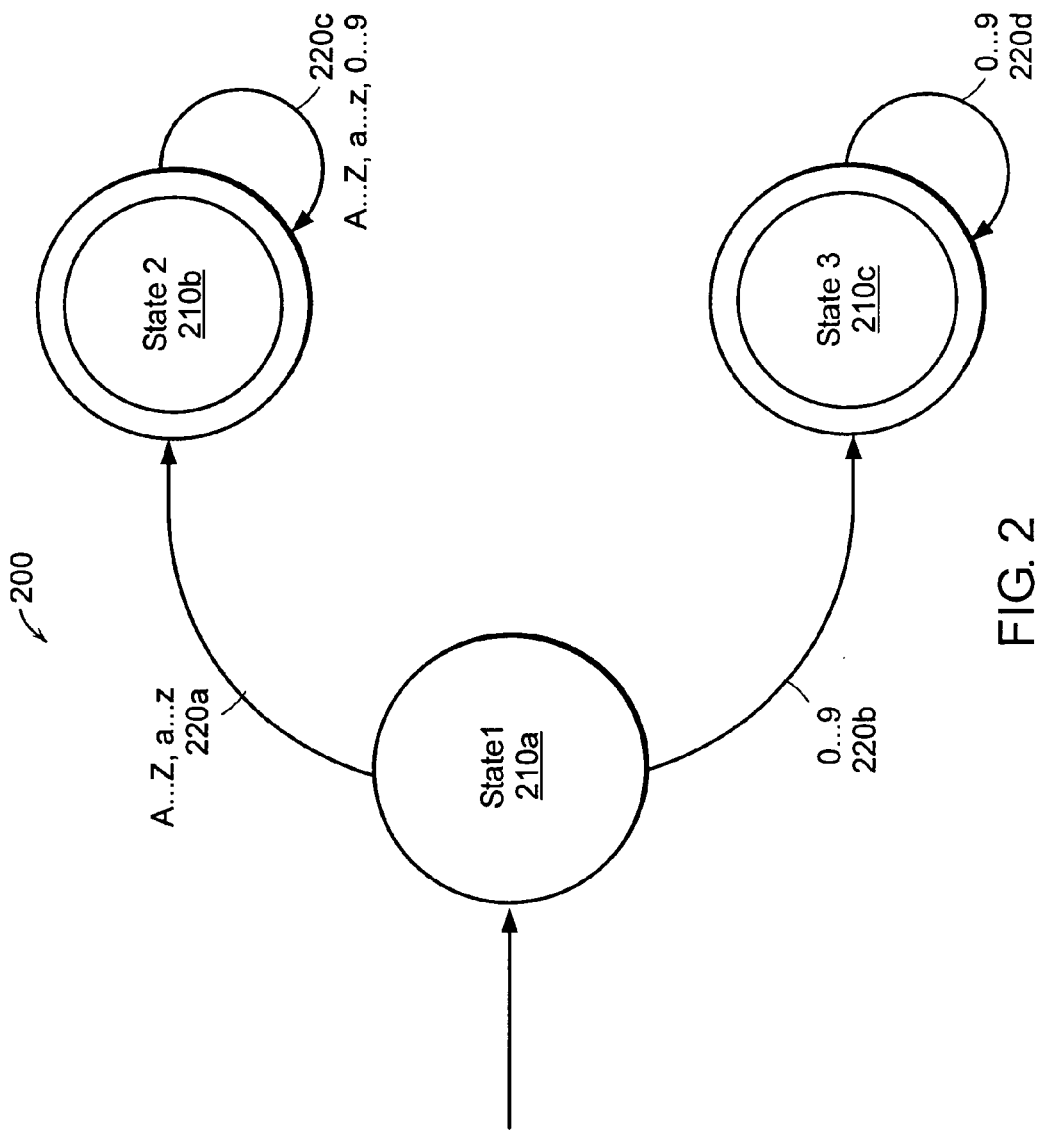
FIG. 2 illustrates a typical DFA graph.

Content aware application processing utilizes patterns/expressions (data) stored in the LLM 118. The patterns/expressions may be in the form of a deterministic finite automata (DFA). The DFA is a state machine. The input to the DFA state machine is a string of (8-bit) bytes (i.e. the alphabet for the DFA is a byte.). Each input byte causes the state machine to transition from one state to the next. The states and the transition function can be represented by a graph 200 as illustrated in FIG. 2A, where each graph node (210a ... 210c) is a state and different graph arcs (220a ... 220d) represent state transitions for different input bytes. The states may contain certain characters related to the state, such as "A ... Z, a ... z, 0 ... 9," etc. The current state of the state machine is a node identifier that selects a particular graph node. For instance, assume that the input contains the text "Richard". From the initial State 1 (210a), the DFA moves to State 2 (210b) where the "R" is read. For the next five characters, "i", "c", "h", "a", "r", "d", the DFA continues to loop (220b) to State 2.

Figure 3:
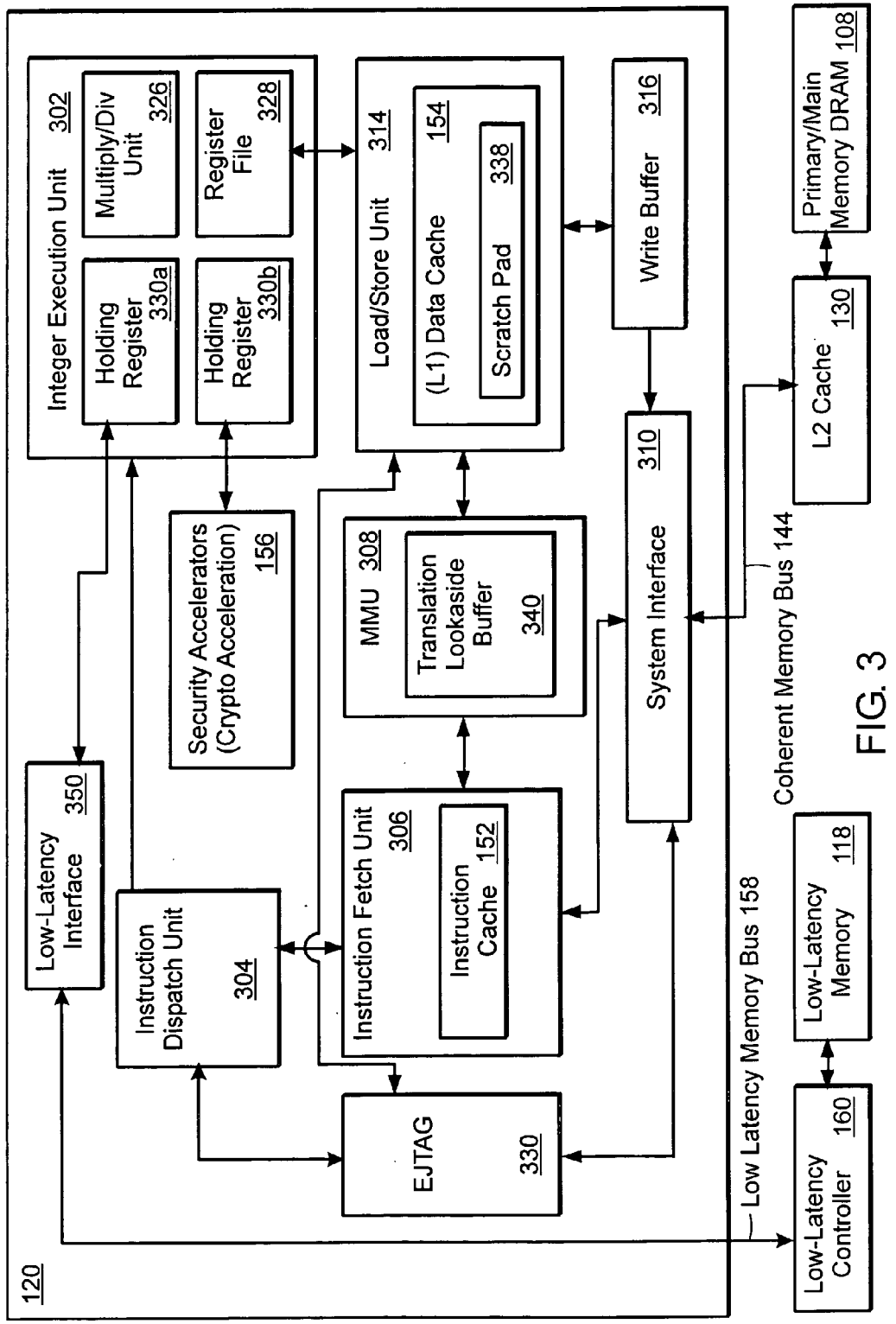
FIG. 3 is a block diagram of a Reduced Instruction Set Computing (RISC) processor according to the principles of the present invention.

FIG. 3 is a block diagram of a Reduced Instruction Set Computing (RISC) processor 120 according to the principles of the present invention. The processor 120 includes an Integer Execution Unit 302, an Instruction Dispatch Unit 304, an Instruction Fetch Unit 306, a Memory Management Unit (MMU) 308, a System Interface 310, a Low-Latency Interface 350, a Load/Store unit 314, a Write Buffer 316, and Security Accelerators 156. The processor core 120 also includes an EJTAG Interface 330 allowing debug operations to be performed. The system interface 310 controls access to external memory, that is, memory external to the processor 120 such as, external (L2) cache memory 130 or primary/main memory 108.

The Integer Execution unit 302 includes a multiply unit 326, at least one register file (main register file) 328, and two holding registers 330a, 330b. The holding registers 330a, 330b are used to store data to be written to the LLM 118 and data that has been read from the LLM 118 using LLM load/store instructions according to the principles of the present invention. The holding registers 330a, 330b improve the efficiency of the instruction pipeline by allowing two outstanding loads prior to stalling the pipeline. Although two holding registers are shown, one or multiple holding registers may be used. The multiply unit 326 has a 64-bit register-direct multiply. The Instruction fetch unit 306 includes instruction cache (ICache) 152. The load/store unit 314 includes a data cache 154. In one embodiment, the instruction cache 152 is 32K bytes, the data cache 154 is 8K bytes and the write buffer 316 is 2K bytes. The Memory Management Unit 308 includes a Translation Lookaside Buffer (TLB) 340.

In one embodiment, the processor 120 includes a crypto acceleration module (security accelerators) 156 that include cryptography acceleration for Triple Data Encryption standard (3DES), Advanced Encryption Standard (AES), Secure Hash Algorithm (SHA-1), Message Digest Algorithm #5 (MD5). The crypto acceleration module 156 communicates by moves to and from the main register file 328 in the Execution unit 302. RSA and the Diffie-Hellman (DH) algorithm are performed in the multiplier unit 326.

Figure 4:
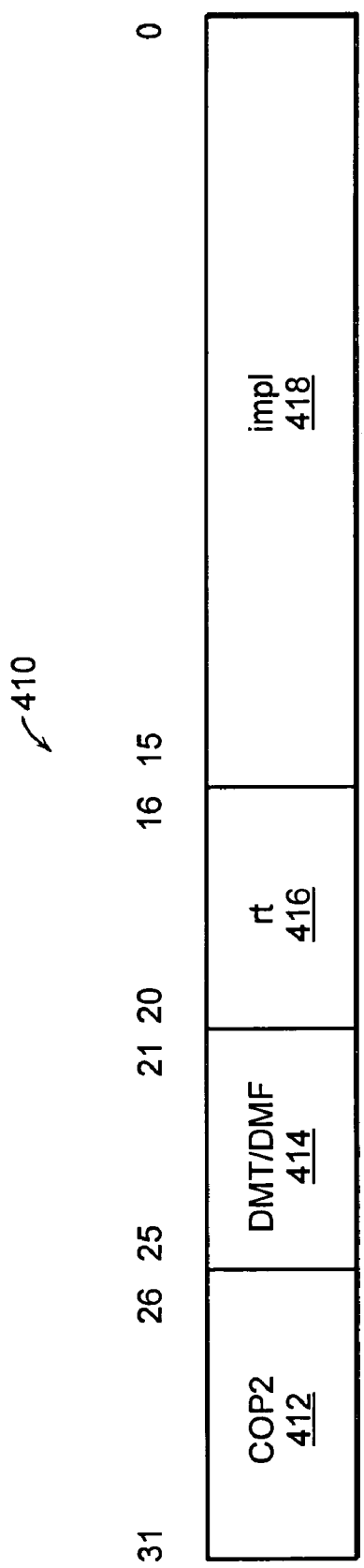
FIG. 4 illustrates a LLM load/store instruction format.

FIG. 4 illustrates a LLM load/store instruction format 410 that a core 120 uses to reference the LLM 118. These load/store instructions differ from the ordinary load store instructions in a typical general purpose instruction set that load/store data between the main register file 328 and the cache coherent memory system that includes L1 data cache 154, L2 cache memory 130, and DRAM 108 (FIG. 3). In contrast, these new instructions initiate either 64-bit or 36-bit loads/stores directly from/to LLC 118 (FIG. 3) to a core 120. These instructions allow data to be retrieved/stored in LLM memory 118 faster than through the cache coherent memory system. This path provided through the LLM load/store instructions to low latency memory 118 improves the performance of applications that do not require caching, such as regular expression matching. These load/store instructions are "DMTC2" (double move to co-processor 2) and "DMFC2" (double move from co-processor 2).

Referring to FIG. 4, the COP2 field 412 indicates that the instruction is a co-processor instruction (i.e., not a general purpose instruction). The DMT/DMF field 414 stores the operation code (i.e., indicates the instruction type). The instruction type DMT indicates that data is being moved from low latency memory 118 to a holding register (330a, 330b). The instruction type DMF indicates that data is being moved from a holding register (330a, 330b) to a register in the main register file load. In one embodiment, the low latency memory 118 is 36-bits wide and each DMT/DMF instruction allows 36-bits to be moved. The rt field 416 identifies a register in the main register file. The impl field 418 in conjunction with the operation code identifies the type of coprocessor move instruction and identifies the holding register 330a, 330b.

To load (DMF) the contents of a holding register to a register in the main register file 338, the rt field identifies the register in the register file to which the data stored in the holding register is stored. For example:

GPR[rt]=LLM_DATA0<63:0>, where
 LMM_DATA0 is holding register 330*a*; and
 GPR is the general purpose register.
For a write (DMT) instruction, the rt field (416) identifies the register in the register file that stores the address of location in low latency memory 118. For example:
LLM_DATA0<63:0>=llmemory[rt], where
 LLM_DATA0 is holding register 330*a*; and
 llmemory is low latency memory.
For example the following low latency memory load instruction (DMTC2) can be used to load the holding register 330*a* with contents of a low-latency memory location instruction, such as:
DMTC2, $5, 0×0400
 DMT is the instruction type, i.e. load holding register with data from low latency memory (414);
 C2 (COP2) indicates a coprocessor instruction (412);
 Register #5 in the main register file 328 (FIG. 3) holds the low-latency memory address location; and
 0×0400 identifies the holding register 330 (FIG. 3) (418) (This value is constant and can be a different value in another embodiment).

Similarly, a low latency memory store instruction can be used to move data from the holding register 330 (FIG. 3) into the main register file 328 (FIG. 3). For example, the following low latency memory store instruction can be used:
DMFC2, $6, 0×0402
 DMF is the instruction type, i.e. store contents of holding register in register $6 in the main register file 328 (414);
 C2 (COP2) indicates a coprocessor instruction (412);
 Register #6 in the main register file 328 is the destination register (rt) (416); and
 0×0402 identifies the holding register 330 (FIG. 3) (418) (This value is constant and can be a different value in another embodiment).

The instruction format shown above is by way of example and it should be understood by one skilled in the art the instruction format can be any format which allows non-ordinary loads/store instructions.

Figure 5:
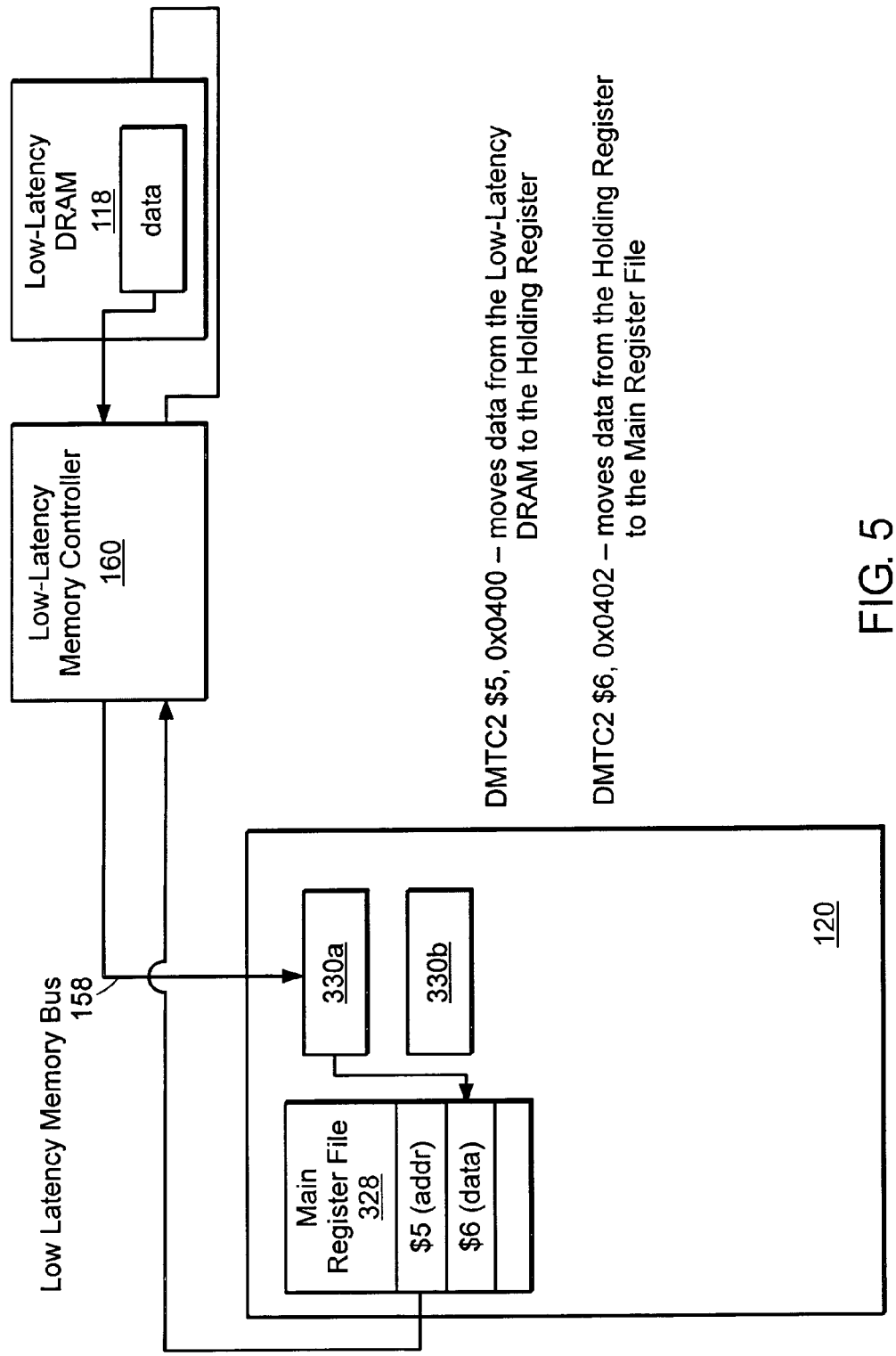
FIG. 5 shows an example use of a load/store operation according to the present invention.

FIG. 5 shows an example of the use of a non-ordinary load instruction to load data into a register in the register file from an LLM memory location according to the present invention. To load the contents of the LLM address location into register 6 ($6) in the main register file 328 using a non-ordinary load instruction, the following instruction sequence is used:
DMTC2 $5, C1 (C1 is a constant value, such as 0×0400);
DMFC2 $6, C2 (C2 is a constant value, such as 0×0402).

The address (location) in low latency memory 118 from which to load data is first stored in register 5 ($5) in the main register file 328. The "DMTC2 $5, 0×0400" instruction reads the data from the location in LLM 118 identified by the address stored in register 5 into holding register 330*a*. Then, the "DMFC2 $6, 0×0402" instruction loads the data stored in holding register 330*a* into $6 in the main register file 328. These instructions effectively bypass all caches using the LLM Bus 158.

Holding register 330*b* can be used instead of holding register 330*a* by changing the values of C1, C2. For example, C1=0×0408 can be changed to C2=0×040a.

While this invention has been particularly shown and described with references to preferred embodiments thereof, it will be understood by those skilled in the art that various changes in form and details may be made therein without departing from the scope of the invention encompassed by the appended claims.

What is claimed is:

1. A processor, comprising:
 at least one processor core;
 a system interface to cache coherent memory which directs memory access for ordinary load/store instructions executed by the at least one processor core to the cache coherent memory; and
 a low latency memory interface to a non-cache memory which directs memory access for non-ordinary load/store instructions executed by the at least one processor core to the non-cache memory, the low latency memory interface directly coupled to the at least one processor core over a dedicated bus, thereby bypassing the cache coherent memory,
 wherein the non-ordinary load/store instructions include an instruction type field, the instruction type field is related to moving data between the non-cache memory and a main register file, the instruction type field having a first instruction type for moving data between the non-cache memory and at least one holding register and a second instruction type for moving the data between the at least one holding register and the main register file;
 wherein the non-cache memory is accessed by the low latency memory interface via a two instruction sequence, the two instruction sequence comprising the first and second instruction types.

2. The processor of claim 1, wherein the non-ordinary load/store instruction is a coprocessor instruction.

3. The processor of claim 1, wherein the at least one holding register is located within an execution unit in the at least one processor.

4. The processor of claim 3, wherein the at least one holding register is separate from the main register file located within the execution unit in the at least processor core.

5. The processor of claim 1, wherein the data is stored in a deterministic finite automata (DFA) graph in the non-cache memory for performing content aware application processing.

6. The processor of claim 1, wherein the non-cache memory is a low-latency memory.

7. The processor of claim 6, wherein the low latency memory is selected from a group consisting of dynamic random access memory (DRAM), reduced latency dynamic random access memory (RLDRAM), static random access memory (SRAM), and fast cycle random access memory (FCRAM).

8. The processor of claim 7, wherein the RLDRAM has a latency of less than or equal to 20 nanoseconds.

9. A method comprising:
 directing memory access for ordinary load/store instructions executed by a processor core to cache coherent memory via a system interface to the cache coherent memory; and
 directing memory access for non-ordinary load/store instructions executed by the processor core to non-cache memory via a low latency memory interface to the non-cache cache coherent memory, the low latency memory interface directly coupled to the processor core over a dedicated bus, thereby bypassing the cache coherent memory;
 wherein the non-ordinary load/store instructions include an instruction type field, the instruction type field is related to moving data between the non-cache memory and a main register file, the instruction type field having a first instruction type for moving data between the non-cache memory and at least one holding register and a second instruction type for moving the data between the at least one holding register and the main register file;

wherein the non-cache memory is accessed by the low latency memory interface via a two instruction sequence, the two instruction sequence comprising the first and second instruction types.

10. The method of claim 9, wherein the non-ordinary load/store instruction is a coprocessor instruction.

11. The method of claim 9, wherein the at least one holding register is located within an execution unit within the processor core.

12. The method of claim 11, wherein the at least one holding register located within the processor core is separate from the main register file located within the execution unit in the processor core.

13. The method of claim 9, wherein the data is stored in a deterministic finite automata (DFA) graph in the non-cache memory for performing content aware application processing.

14. The method of claim 9, wherein the non-cache memory is a low-latency memory.

15. The method of claim 14, wherein the low-latency memory is selected from a group consisting of dynamic random access memory (DRAM), reduced latency dynamic random access memory (RLDRAM), static random access memory (SRAM), and fast cycle random access memory (FCRAM).

16. The method of claim 15, wherein the processor core accesses the RLDRAM with less than or equal to 20 nanosecond latency.

17. A system for increasing processor speed for content aware application processing, comprising:

a processor, the processor including at least one processor core and an interface to a non-cache memory; and non-ordinary load/store instructions included in a general purpose instruction set for moving data between the at least one processor core and the non-cache memory, the non-cache memory interface directly coupled to the at least one processor core over a dedicated bus, thereby bypassing cache coherent memory;

wherein the non-ordinary load/store instructions include an instruction type field, the instruction type field is related to moving data between the non-cache memory and a main register file, the instruction type field having a first instruction type for moving data between the non-cache memory and at least one holding register and a second instruction type for moving the data between the at least one holding register and the main register file;

wherein the non-cache memory is accessed by a low latency memory interface via a two instruction sequence, the two instruction sequence comprising the first and second instruction types.

* * * * *